(No Model.)
C. E. JOHNSON.
BICYCLE LOCK AND BRAKE.
No. 545,959. Patented Sept. 10, 1895.
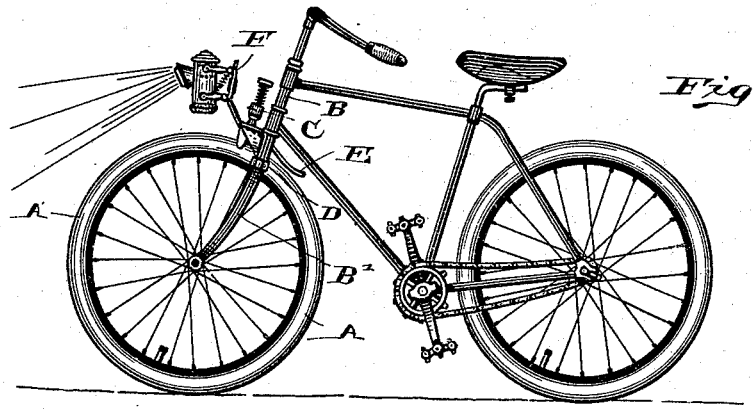
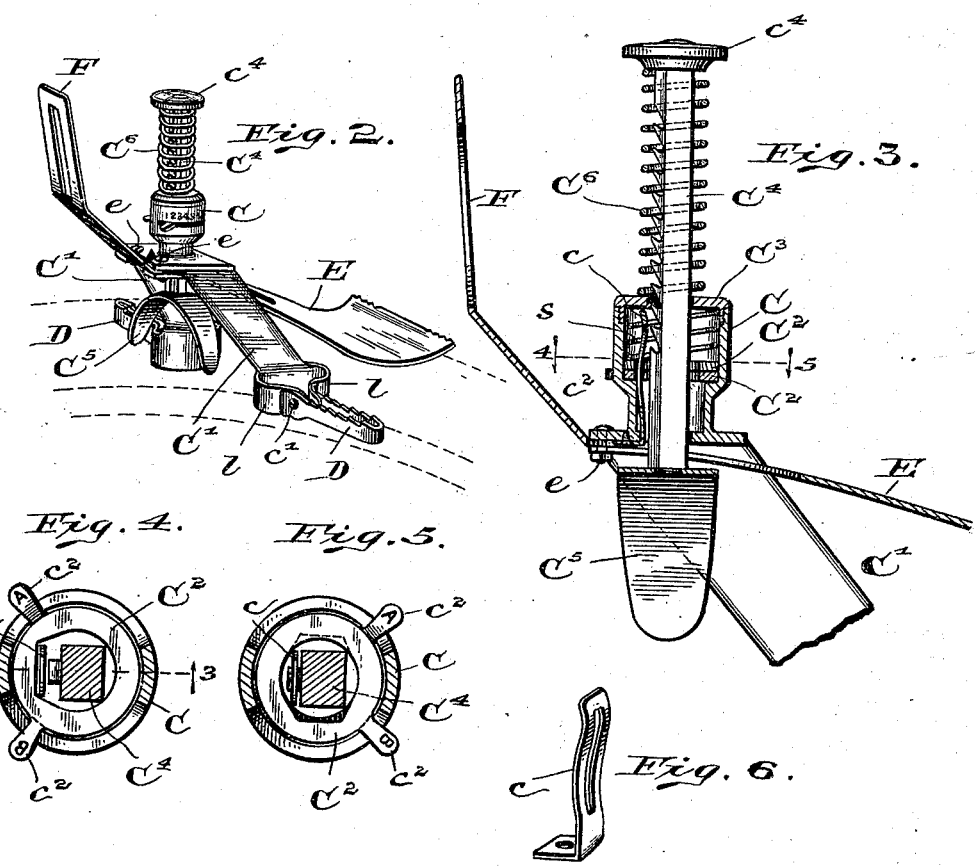
WITNESSES:
INVENTOR
Charles E. Johnson,
BY
Chester Bradford,
ATTORNEY.

UNITED STATES PATENT OFFICE.

CHARLES E. JOHNSON, OF MOUNT JACKSON, ASSIGNOR TO THE JOHNSON NOVELTY COMPANY, OF INDIANAPOLIS, INDIANA.

BICYCLE LOCK AND BRAKE.

SPECIFICATION forming part of Letters Patent No. 545,959, dated September 10, 1895.

Application filed March 19, 1895. Serial No. 542,424. (No model.)

*To all whom it may concern:*

Be it known that I, CHARLES E. JOHNSON, a citizen of the United States, residing at Mount Jackson, in the county of Marion and State of Indiana, have invented certain new and useful Improvements in Bicycle Locks and Brakes, of which the following is a specification.

The principal object of my present invention is to produce a simple, secure, and easily-operated lock for bicycles. This lock may in part be a brake, and there may be combined therewith a foot-brake and "coasters," and a lamp-bracket may also be attached thereto, preferably in such a manner as to become a part of the same structure.

A bicycle provided with attachments embodying my invention will be first fully described, and the novel features of such attachments then pointed out in the claims.

Referring to the accompanying drawings, which are made a part hereof and on which similar letters of reference indicate similar parts, Figure 1 is a side elevation of a bicycle equipped with such attachments; Fig. 2, a detail perspective view of said attachments and immediately adjacent parts on a considerably enlarged scale; Fig. 3, a central sectional view through the lock proper on the dotted line 3 3 in Fig. 4; Figs. 4 and 5, horizontal sectional views looking downwardly from the dotted line 4 5 in Fig. 3, one showing the lock with its parts in unlocked position and the other showing them in locked position; and Fig. 6 a perspective view of the spring-catch separately.

In said drawings the portions marked A represent the rim, including the tire, of the front wheel of a bicycle; B, the standard of the bicycle-frame; C, the main portion or body of my improved lock; D, the coasters; E, the foot-brake, and F the lamp-bracket.

The wheels, including the rim A, and the frame, including the standard B, of the bicycle are or may be of any ordinary or desired construction, and will not therefore be further described herein, except incidentally in describing the invention.

The lock-body C is secured to the forks B' of the frame B by arms C', the ends of which pass around said forks and are clamped thereon by bolts $c'$, which also in the construction shown connect the coasters D thereto. The lock-body C is hollow and has two or more slots extending to the outside, through which arms $c^2$ on the corresponding tumblers $C^2$ extend, which arms serve both as handles by which to move the tumblers and as indicating-points by which their positions may be determined with reference to the dial-figures inscribed upon the exterior of the lock-body, as shown in Fig. 2. A light friction-spring $s$, as shown in Fig. 3, is interposed between the upper one of these tumblers and the under side of the cap which serves to hold said tumblers to the position which they have been adjusted. The bottom of the lock-body C is preferably formed integrally therewith, as shown most plainly in Fig. 3, and the top consists of a cap portion $C^3$, which is screwed thereon. Centrally in the top and bottom are square perforations through which the rod or stem $C^4$ extends, upon the lower end of which is the friction-plate $C^5$, which comes in contact in operation with the surface of the tire of the wheel A, and upon the upper end it is provided with a head or enlargement $c^4$. When not in use, the rod is adapted to play freely up and down through the openings in the cap C, and the body of the lock-body, and it is held up and the friction-plate $C^5$ thus held out of contact with the wheel by the coiled spring $C^6$, which surrounds said rod or stem, and is interposed between the cap $C^3$ and the head $c^4$, or such device as may be arranged to take the place of said head. When the rod is pushed down, the friction-plate $C^5$ comes in contact with the wheel-tire and serves as a lock or brake.

The rod $C^4$ has hook-shaped notches in one face, and a spring-catch $c$ is adapted to engage with said notches, and when so engaged said spring will hold said stem down to whatever position it has been pushed, and the apparatus is so arranged that when the parts are engaged the friction-plate $C^5$ may bear forcibly upon the wheel-tire, and thus lock or brake the wheel.

The tumblers $C^2$ have central perforations which are round in the main, but are flattened and extended at one side, as shown most plainly in Figs. 4 and 5. When they are turned so that these flattened or extended portions of the perforations register, as shown in Fig. 4, the spring-catch $c$ flies back into the consequent recess and out of engagement with the notches in the stem $C^5$ after said spring has been released by pushing down the rod so that the hooks of the spring are released from engagement. When, however, these tumblers are so turned that these recessed places are out of registry, this spring-catch $c$ is forced into contact with the stem $C^4$, and when said stem is pushed down the upper slotted or hooked end of the spring will engage with one of the notches in said stem, and said stem and its friction-plate are thus held into their operative positions. The notches in the stem $C^4$ are hooked upwardly, and the engaging-point at the upper end of the spring $c$ is formed to hook downwardly, so that when the notches are brought into engagement they will, under the pressure of the spring $C^6$, be held together, without reference to the positions of the tumblers $C^2$, and thus said tumblers can be moved into any position—even that where (if the rod is pressed downwardly) they will permit the spring to fly out—without danger of disengaging these parts unless said rod is pressed upon. In unlocking the wheel it is necessary, first, to set the tumblers to the proper position, as in Fig. 4, so that the flattened or extended portions of the perforations will register, and then push down slightly on the rod $C^4$, which, as will be readily understood, will release the engagement between the spring $c$ and said rod or stem $C^4$, when said spring will fly out of engagement with the notches in the stem, and thus complete the unlocking. In locking the wheel it is only necessary to be sure that the flattened or extended portions of the perforations in the tumblers $C^2$ do not register, as in Fig. 5, as any material departure from registry will insure operative contact between the spring-hook $c$ and the notched stem $C^4$, and then push down the rod or stem $C^4$ with the required force to produce the desired friction between the friction-plate $C^5$ and the wheel A, and the parts will be there held until purposely released.

The coasters D are in themselves of an ordinary and well-known construction, and consist simply of preferably bifurcated arms, having serrations, upon which the bicyclist may rest his feet while coasting. They are peculiar only in being united to and substantially forming a finish upon the outer ends of the arms $C'$, and being secured in place by the same bolts $c'$ which clamp the fingers of said arms around the forks of the bicycle-frame, as illustrated by Figs. 1 and 2. When so arranged and connected the two parts of each of these coasters form also washers for the head and nut of the corresponding bolt, and, as above stated, the whole forms a finish inclosing the otherwise unsightly projecting ends of the attachment.

The foot-brake E is formed of spring metal is attached to the lock-case by the bolts $e$, and extends back beneath the lock between the forks of the frame to the rear side, where a serrated contact portion is preferably provided, as shown most plainly in Fig. 2, upon which the rider may place the toes of his foot, and thus apply a brake whenever desired. The stem or rod $C^4$ passes down through the forward bifurcated or slotted portion of this brake E, and the friction-plate $C^5$ is thus below and free therefrom.

The lamp-bracket F is secured to the bottom of the lock-body C by the same bolts $e$ which secure the foot-brake E thereto, and said bracket extends up in front of the lock and above the wheel A, where it may conveniently carry a lamp, as shown in Fig. 1.

My invention includes, as above described at length, in a single structure a lock, which may be also used as a brake, a foot-brake, coasters, and a lamp-bracket, and the whole structure is adapted to be secured to the frame of any ordinary bicycle quickly and easily without the change of any parts and without marring or disfiguring the bicycle itself. The loops $l$ on the ends of the arms $C'$, which surround the forks $B'$ of the bicycle-frame, are of thin metal and yielding, so that they may be readily clamped tight onto said forks by the force of the screws $c'$, and are sufficiently yielding to conform to said frame-forks.

Having thus fully described my said invention, what I claim as new, and desire to secure by Letters Patent, is—

1. The combination, in a bicycle lock, of a body portion adapted to be secured to the bicycle frame, a stem passing through the same and provided with notches, a spring catch secured to the lock body and adapted to engage with said notches in the stem, tumblers within said body portion having irregular perforations therein which surround said stem and said spring catch whereby said spring catch may be operated, a dial on said body, and arms on the tumblers for operating and determining the positions of said tumblers, substantially as set forth.

2. The combination, in a bicycle lock, of a reciprocating stem having a friction plate adapted to come in contact with the wheel tire and also having hook-shaped notches therein, a lock-body having suitable perforations through which said stem passes and provided with a spring catch adapted upon occasion to engage with notches in the stem, tumblers within the lock-body adapted to force the spring catch into engagement with the notches in the stem and having recesses which when in registry will permit the disengagement thereof, and a spring which supports the stem in raised position, and also when the spring catch and notches are in engagement maintains said engagement until said spring is compressed, leaving the tumblers meanwhile free, substantially as set forth.

3. The combination, with a bicycle, of a combined lock, foot brake, and coasters, which combined structure is connected to the bicycle frame above the wheel, the frame of the lock extending out and embracing the forks of the frame, and the coasters being arranged to embrace the projecting ends of the portions of said lock frame which surround said forks and thus be united to said forks by a single clamp bolt at each side, and the foot-brake being secured to the lock-body, all substantially as shown and described.

4. The combination, in a single structure, of a bicycle lock provided with arms, and loops on the ends of said arms adapted to surround the forks of the frame, coasters adapted to be secured to the other ends of said loops, a foot brake and a lamp bracket secured to the lock structure, the whole being attachable and removable to the frame forks of a bicycle, substantially as shown and described.

In witness whereof I have hereunto set my hand and seal, at Indianapolis, Indiana, this 9th day of March, A. D. 1895.

CHARLES E. JOHNSON. [L. S.]

Witnesses:
  CHESTER BRADFORD,
  JAMES A. WALSH.